No. 843,552. PATENTED FEB. 5, 1907.
W. H. ROBINSON.
FEED BAG.
APPLICATION FILED FEB. 20, 1906.
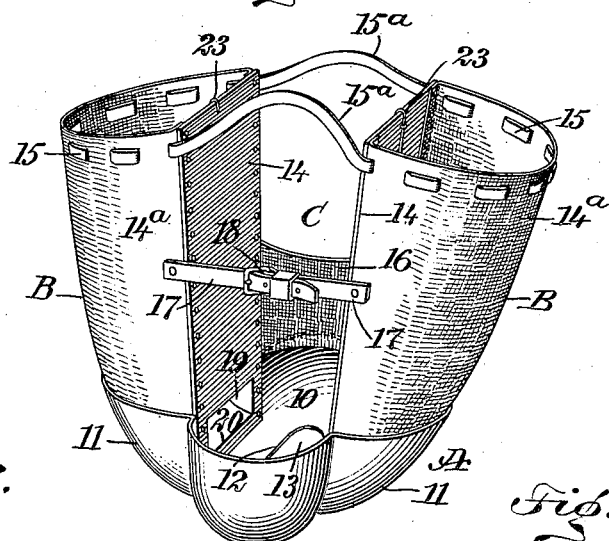
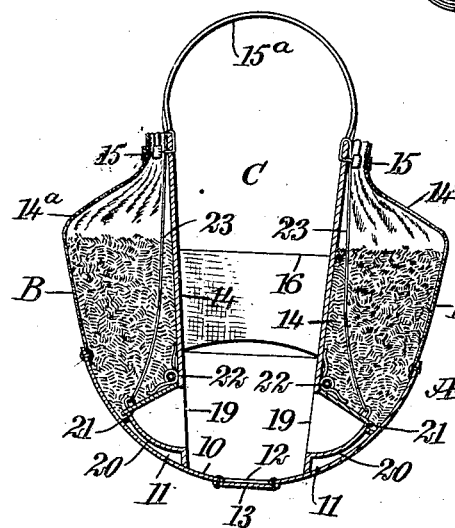
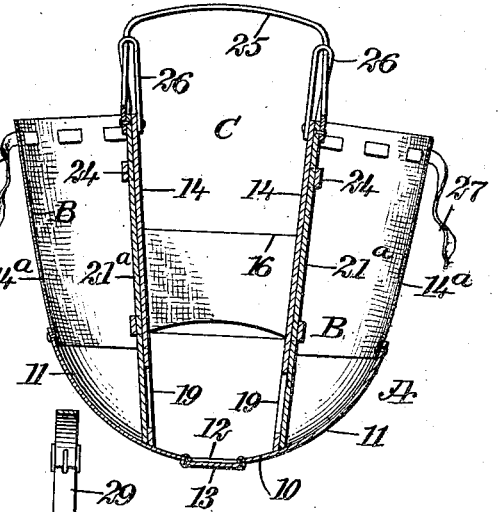
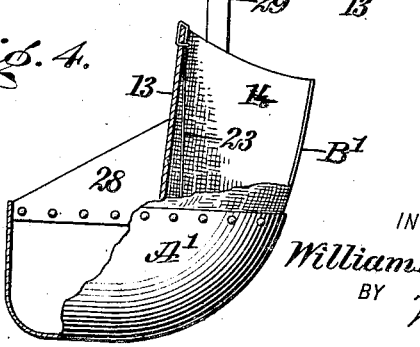
WITNESSES:
INVENTOR
William H. Robinson
BY Munn & Co
ATTORNEYS

UNITED STATES PATENT OFFICE.

WILLIAM H. ROBINSON, OF NEW YORK, N. Y., ASSIGNOR OF ONE-HALF TO FREDERICK HULBERG, OF NEW YORK, N. Y.

FEED-BAG.

No. 843,552.     Specification of Letters Patent.     Patented Feb. 5, 1907.

Application filed February 20, 1906. Serial No. 302,060.

*To all whom it may concern:*

Be it known that I, WILLIAM H. ROBINSON, a citizen of the United States, and a resident of the city of New York, borough of Manhattan, in the county and State of New York, have invented a new and Improved Feed-Bag, of which the following is a full, clear, and exact description.

My invention relates to an improvement in feed-bags, and has for its object to provide a humane bag, one so constructed that the nostrils of the horse will not be inclosed when feeding, and enabling the animal to freely breathe at such time.
Another purpose of the invention is to provide a feed-bag consisting of a tray from which the animal takes the feed, one or more receptacles for the storage of the feed and having valve-controlled outlets leading to the tray, and means for opening the valves when the bag is in position upon the animal, whereby the animal cannot only feed and have its nostrils exposed, but whereby also the feed is fed to the tray just as needed, thus obviating waste.

The invention consists in the novel construction and combination of the several parts, as will be hereinafter fully set forth, and pointed out in the claims.
Reference is to be had to the accompanying drawings, forming a part of this specification, in which similar characters of reference indicate corresponding parts in all the figures.
Figure 1 is a perspective view of the improved feed-bag. Fig. 2 is a vertical section through the same, the mouth portion of the bag being closed. Fig. 3 is a vertical section through a slightly-modified form of the bag, and Fig. 4 is a sectional side elevation of a further modified form of the bag.

The device consists, primarily, of a tray A and receptacles B. The tray A is preferably made of metal, although other stiff material may be employed, and said tray comprises an oblong or oval body 10, which is segmental in cross-section and opposing side offsets 11 from the said body, the upper edges of the offsets being preferably flush with the upper edges of the body 10. Ordinarily in the bottom of the body 10 an elongated opening 12 is made, and this opening is closed by a strip 13, usually of leather, which is attached to the bottom of the body of the tray, so that the grain will find a lodgment in the recess thus formed and may be readily taken up by the animal; but the opening 12 may be omitted and the bottom of the body made plain, or it may be provided with an elongated depression; but the leather is retained when the tray is made of metal in order to protect the tongue of the animal in cold weather.

The receptacles B are formed by securing plates 14 of desired height to the body 10, where the offsets 11 connect with the body, and attaching the vertical edges of strips of fabric 14ª to the said plates 14 adjacent to their longitudinal edges, the bottom edges of the strips of fabric 14ª being also secured in any approved manner to the upper marginal portion of the offsets 11.

An endless strap 15 is laced through the upper portion of the pliable members 14ª of the receptacles B, and those portions 15ª of the said strap crossing the space C between the receptacles are adapted to be passed over the animal's neck when the bag is placed in position for feeding, and at such time the strap 15 also serves as a draw-string, as when the receptacles B have received their quota of feed the strap is utilized to gather in and close the mouth portions of the receptacles, as is illustrated in Fig. 2.

A chin-piece 16, also preferably of fabric, extends from one receptacle B to the other at the rear of the body-section 10 of the tray A, and the receptacles are also connected at their forward portions by straps 17, one of the straps being provided with a suitable buckle 18, as is shown in Fig. 1. An opening 19 is made in the lower end of the plate or stiff strip 14 of each receptacle B, and in the form of the device shown in Figs. 1 and 2 a pocket 20 is formed at the rear of each of the openings 19, extending within the receptacles, and the said pockets are provided at their upper portions with covers 21, held normally closed by suitable springs 22. Each cover 21 has one end of a cord 23 attached thereto, the other end of said cord being usually carried up and secured to the upper edge portion of a receptacle B. Thus by drawing upward upon the cords 23 the valves or covers 21 can be opened and held open, permitting the grain to gradually feed from both receptacles into the tray, and in this manner the animal will be kept supplied with sufficient grain to be satisfactory and yet not enough at any one time to be wasted.

In the construction shown in Fig. 3 the difference relates only to the manner in which the bag is suspended and in the construction of the valves for the openings 19. Under the construction shown in Fig. 3 the valves 21ª are slide-valves, moving through suitable guides 24, secured to the inner faces of the inner walls of the receptacles formed by the aforesaid strips 14. These valves are preferably made wide at the bottom, so that the openings 19 may be made quite wide; but the upper portions of the valves are made quite narrow, or those portions passing through the guides, so as to form a stem for each guide, and these stems are ordinarily carried up to the upper edges of the receptacles, where the ends of a strap 25 are attached thereto. This strap is utilized to support the bag in position for feeding, and consequently when the bag is placed over the head of the animal the weight of the bag will open the valves and keep them open, the valves being prevented from moving too far upward by loops 26, provided at the upper edges of the receptacles over the valve-stems, and the suspension-strap 25 passes through the said loops. A draw-string 27 in this form of the bag is provided for each receptacle B.

In the form of the device shown in Fig. 4 the tray A' is a single tray, and its rear end is curved at the bottom, while its forward end portion is practically straight. The receptacle B', only one of which is employed, is constructed identically with the receptacles shown in either Figs. 1 or 3 and is located at the rear end portion of the tray, being suitably attached thereto, and guard-strips 28 are usually provided at the upper forward side portions of the tray A, extending from the front to the receptacle B', and a suitable suspension-strap 29 is attached to the said single receptacle B'.

Having thus described my invention, I claim as new and desire to secure by Letters Patent—

1. A feed-bag consisting of a tray, opposing receptacles located at opposite sides of the tray, having openings leading thereto, valves for the said openings, and supports for the bag connected with said valves, whereby when the bag is in position for feeding the said valves are opened and so held.

2. A feed-bag, comprising a tray, opposing receptacles at the sides of the tray and having openings leading into the same, slide-valves for closing said openings, and a strap having its ends attached to the said valves.

3. A feed-bag, comprising an oblong tray having opposing offsets, plates secured to the tray at the junction of the offsets with the tray, said plates having openings in their lower ends, and strips of fabric attached to the longitudinal edges of the plates and to the upper edges of the offsets of the tray.

4. A feed-bag, comprising an oblong tray having opposing offsets, plates secured to the tray at the junction of the offsets with the tray, said plates being provided with openings in their lower ends, strips of fabric attached to the upper edges of the offsets and to the longitudinal edges of the plates, valves for controlling the openings, and means for operating the valves.

5. A feed-bag, comprising a tray having opposing offsets, plates secured to the tray at the junction of the offsets with the tray, said plates having openings in their lower ends, strips of fabric secured to the upper edges of the offsets and to the longitudinal edges of the plates, and forming with the plates receptacles, valves mounted to slide on the said plates and adapted to close the openings therein, a strap having its ends secured to the upper ends of the valves, and means for closing the upper ends of the receptacles.

6. In a feed-bag, the combination with a tray, of a plate secured to the tray and having an opening at its lower end, a strip of fabric secured to the tray and to the longitudinal edges of the plate, a valve for closing the opening in the plate, and means for operating the valve.

In testimony whereof I have signed my name to this specification in the presence of two subscribing witnesses.

WILLIAM H. ROBINSON.

Witnesses:
 GEORGE ISAACS,
 CHARLES MINCK.